Patented May 8, 1923.

1,454,700

UNITED STATES PATENT OFFICE.

PASCAL CHARUEST AND HENRI HORMISDAS DUCHESNE, OF MONTREAL, QUEBEC, CANADA, ASSIGNORS TO BENOIT AND MATHIEU, OF MONTREAL, QUEBEC, CANADA.

COMPOSITION FOR AND METHOD OF MANUFACTURING SOUND AMPLIFIERS.

No Drawing.     Application filed December 24, 1921. Serial No. 524,787.

*To all whom it may concern:*

Be it known that we, PASCAL CHARUEST and HENRI HORMISDAS DUCHESNE, British subjects, residing at 195 St. Timothee Street, in the city of Montreal, in the Province of Quebec, in the Dominion of Canada, have invented certain new and useful Improvements in Compositions for and Methods of Manufacturing Sound Amplifiers; and we do hereby declare that the following is a true, clear, and correct description of the same.

The present invention relates to improvements in a composition for and method of manufacture of sound amplifiers, and its main object is to provide an amplifier made of a plastic matter which after special treatment will have high vibrating and resonant qualities for sound reproduction purposes.

Another object is to provide a sound amplifier which is simple, durable and cheap to manufacture.

The invention consists particularly in thoroughly mixing pulverized wood, starch, and colophony. The approximate proportions are as follows:

| | Pounds. |
|---|---|
| Pulverized wood | 100 |
| Starch | 42 |
| Colophony | 33½ |

In preparing said composition, 2 pounds of starch are mixed in one gallon of water. The mixture of pulverized wood, starch and colophony is spread on a table, and the starched water is then sprinkled over the sheet of mixture, so as to form a paste. The whole is then preferably gathered into a pile so as to obtain an equal amount of moisture in the mixture. The mixture is then left to rest for two hours, after which it is placed in a suitable mould and heated to approximately 200° Fahrenheit for twenty minutes.

The result is that a light, crisp and cheap product is obtained, having great vibrating and resonant qualities which render it particularly suitable for the construction of sound amplifiers.

What we claim as our invention is:

1. A composition for the construction of resonant sound amplifiers, consisting of pulverized wood, starch and colophony.

2. A composition for the construction of resonant sound amplifiers, consisting of a mixture of 100 pounds of pulverized wood, 42 pounds of starch, and 33½ pounds of colophony.

3. As a new article of manufacture, material for the construction of resonant sound amplifiers, consisting of a mixture of pulverized wood, starch and colophony molded under heat and pressure.

4. As a new article of manufacture, material for the construction of resonant sound amplifiers, consisting of a mixture of 100 pounds of pulverized wood, 42 pounds of starch, and 33½ pounds of colophony subjected to a molding action in the presence of heat.

Signed at Montreal, Quebec, Canada, this 28th day of November, 1921.

PASCAL CHARUEST.
HENRI HORMISDAS DUCHESNE.

Witnesses:
    C. PATENA DE,
    G. BEAUDOIN.